US009022268B2

(12) United States Patent
Gallagher

(10) Patent No.: US 9,022,268 B2
(45) Date of Patent: May 5, 2015

(54) LADDER CLAMP AND METHOD THEREOF

(75) Inventor: Dominic Gallagher, Deeside (GB)

(73) Assignee: Rhino Products Limited, Deeside (GB)

( * ) Notice: Subject to any disclaimer, the term of this patent is extended or adjusted under 35 U.S.C. 154(b) by 736 days.

(21) Appl. No.: 13/006,221

(22) Filed: Jan. 13, 2011

(65) Prior Publication Data

US 2011/0284606 A1   Nov. 24, 2011

(30) Foreign Application Priority Data

Jan. 13, 2010  (GB) .................................. 1000498.4

(51) Int. Cl.
| B60R 11/00 | (2006.01) |
| B60R 9/048 | (2006.01) |
| B25B 5/06 | (2006.01) |
| F16B 7/14 | (2006.01) |
| F16B 21/20 | (2006.01) |
| F16B 2/24 | (2006.01) |
| F16B 45/00 | (2006.01) |

(52) U.S. Cl.
CPC ............... B60R 9/0485 (2013.01); B25B 5/068 (2013.01); F16B 2/246 (2013.01); F16B 7/1454 (2013.01); F16B 21/20 (2013.01); F16B 45/00 (2013.01)

(58) Field of Classification Search
CPC ..... B60R 9/0485; F16B 7/1454; F16B 21/20; F16B 45/00; F16B 2/246
USPC ......... 224/570, 448, 456, 461, 458, 462, 515, 224/536, 323, 42.39, 400, 405, 309; 269/136, 6, 229
See application file for complete search history.

(56) References Cited

U.S. PATENT DOCUMENTS

| 4,153,188 | A | * | 5/1979 | Seymour ..................... 224/42.24 |
| 4,827,742 | A | * | 5/1989 | McDonald ........................ 70/19 |
| 5,222,420 | A | * | 6/1993 | Sorensen et al. ................ 81/487 |
| 5,918,488 | A | * | 7/1999 | Deeter .............................. 70/14 |
| 6,648,314 | B1 | * | 11/2003 | Degen et al. ....................... 269/6 |
| 7,140,582 | B1 | * | 11/2006 | Miller et al. ............. 248/231.41 |
| 7,467,719 | B2 | * | 12/2008 | Crowell et al. .................. 211/64 |
| 7,530,556 | B1 | * | 5/2009 | Zheng .............................. 269/6 |
| 2001/0030213 | A1 | | 10/2001 | Anderson |
| 2005/0098595 | A1 | | 5/2005 | Smith et al. |
| 2007/0187879 | A1 | * | 8/2007 | Ben-Gigi .......................... 269/6 |
| 2009/0206534 | A1 | * | 8/2009 | McCracken ...................... 269/6 |

FOREIGN PATENT DOCUMENTS

| GB | 2169340 A | * | 7/1986 | .................... 224/570 |
| GB | 2 205 354 A | | 12/1988 | |
| GB | 2 352 765 A | | 2/2001 | |
| GB | 2 425 805 A | | 11/2006 | |
| GB | 2 452 946 A | | 3/2009 | |
| GB | 2 470 555 A | | 12/2010 | |
| WO | WO 2010/136794 A1 | | 12/2010 | |

* cited by examiner

Primary Examiner — Adam Waggenspack
Assistant Examiner — Matthew Theis
(74) Attorney, Agent, or Firm — Oliff PLC

(57) ABSTRACT

A ladder clamp including an anchor part and a ladder retaining part, wherein the anchor part includes an anchor able to be arranged to cooperate with a fixing on a vehicle, and the ladder retaining part includes a body and a securing means, the securing means being co-operable with the anchor part to clamp the ladder retaining part to the anchor part in a releasable manner, wherein the securing means includes a locking element that pivots with respect to the body between clamped and unclamped orientations.

19 Claims, 9 Drawing Sheets

Fig. 1 (Related Art)
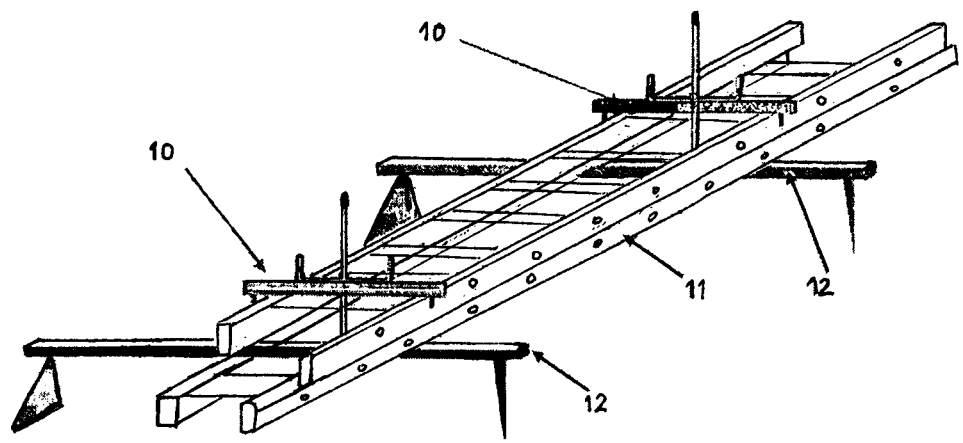
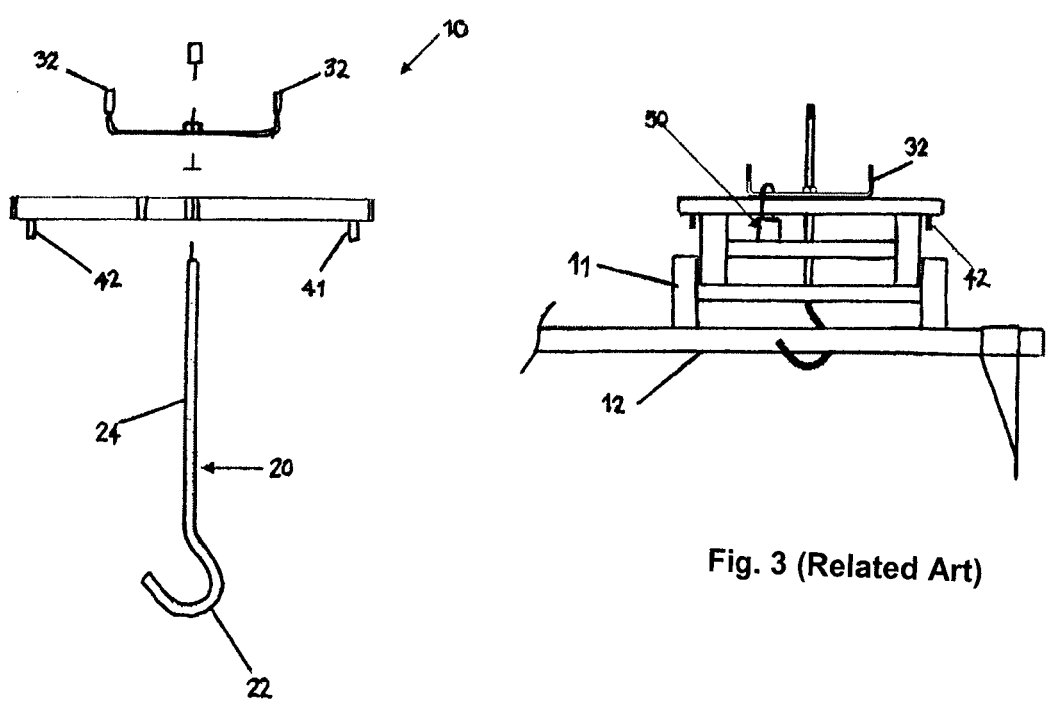
Fig. 3 (Related Art)
Fig. 2 (Related Art)

LADDER CLAMP AND METHOD THEREOF

BACKGROUND

The invention relates to an improved ladder clamp for holding a ladder to roof bars of a vehicle and a method thereof.

Ladder clamps are known. A typical ladder clamp 10 is shown in FIGS. 1-3. As shown, a ladder clamp 10 is used to hold either end of a ladder 11 to a vehicle's roof bars 12. Here, each ladder clamp 10 includes a generally hooked shaped part 20 having a hook 22 for hooking underneath the roof bar 12 and an elongated portion 24 that extends up and away from the roof bar. The elongated portion 24 has a thread down its length. The thread is typically machined or rolled. An oversized wing nut 30 having upstanding handles 32 is screwable up and down the thread of the elongated portion 24. In use the ladder is placed on the roof bars 12. The hook part 20 is arranged under the roof bar and a clamp bar 40 fitted over the top of the ladder by inserting an end of the elongated portion 24 through an aperture in the clamp part 40 so that the clamp bar 40 can slide down the elongated portion. The wing nut 30 is subsequently twisted about the elongated portion to tighten down on the clamp bar 40 in order to securely hold the ladder in place. Two protrusions 41, 42 restrict side-to-side movement of the ladder 11. A lock 50 can be used to stop unauthorized removal of the ladder.

The threaded coupling between the elongate portion 24 and the oversized wing nut 30 has been found to be slow to use and not particularly easy to use. For instance, to move the wing nut sufficiently to remove the ladder clamp, the wing nut has to be rotated many times. This is time consuming and not particularly convenient. Also, the thread is prone to damage. For instance, the threads can corrode (e.g. rust) or the threads can become mechanically deformed from mishandling the parts or from other parts contacting them. In each event, the threaded connection fails causing the ladder clamp to have to be replaced.

BRIEF SUMMARY

It is an aim of the present invention to attempt to overcome at least one of the above or other identified problems. It is a particular aim to provide a ladder clamp that can be quickly and easily installed. It is another aim to provide a ladder clamp that is less prone to damage.

According to the present invention there is provided a ladder clamp and method of securing a ladder to a vehicle as set forth in the appended claims. Other features of the invention will be apparent from the dependent claims, and the description which follows.

According to an exemplary embodiment there is provided a ladder clamp comprising an anchor part and a ladder retaining part. An anchor portion of the anchor part is able to be arranged to co-operate with a fixing on a vehicle. The ladder retaining part includes a body and a securing means. The securing means is co-operable with the anchor part to clamp the ladder retaining part to the anchor part in a releasable manner. Suitably, the body is able to be arranged to restrict the movement of a ladder in order to secure a portion of the ladder to the fixing on the vehicle. Advantageously, the securing means comprises a locking element that is able to pivot with respect to the body. In an un-clamped orientation the locking element does not restrict relative movement between the anchor part and the ladder retaining part. Consequently, the ladder retaining part can be arranged in a first position relative to the anchor portion of the anchor part. In a clamped orientation the locking element clamps to the anchor part. Thus the locking element restricts movement of the ladder retaining part away from the anchor portion of the anchor part. This is achieved in the exemplary embodiments by the locking element abutting a stop on the body to prevent movement of the ladder retaining part.

It will be appreciated that because the ladder clamp does not employ a threaded connection, the ladder retaining part can be quickly arranged on the anchor part at the position to be locked and does not rely on a time consuming process of winding a nut along a length of thread. Thus, different sized ladders can be quickly and conveniently swapped on and off the vehicle. Furthermore, the ladder clamp eliminates the need to have a separate nut and clamp bar. Thus the end user has a fewer number of parts to assemble in order to use the ladder clamp to hold a ladder to a vehicle, which simplifies the operation.

Known ladder clamps have an elongate part which enables the enlarged wing nut to clamp down on a ladder at any point along the elongate part. This allows different ladder sizes (i.e. 1, 2 or 3 section ladders) to be carried on the vehicle. Consequently, the exemplary embodiments show the anchor part comprising an elongate part such as a rod. Here, the ladder retaining part co-operates with the rod. The rod has an elongate axis. Here the securing means co-operates with the anchor by relative movement along the elongate axis.

In the exemplary embodiments, the locking element is moved between the un-clamped orientation and the clamped orientation by a movement means. The movement means suitably includes a handle to cause the locking element to pivot. This is advantageous because the handle can be locked in any well known manner. Locking the handle prevents movement of the handle and therefore also prevents movement of the locking element between the clamped and un-clamped orientations. It is preferable if the handle is arranged to move a control element. The control element is arranged to move one part of the locking element away from a point on the body to move the locking element from the un-clamped orientation to the clamped orientation. Suitably, in the exemplary embodiments, the control element comprises a cam. Here, the cam co-operates with one area of the locking element to cause the locking element to pivot relative to a spaced second area, in order to move the locking element between the clamped and un-clamped orientations. Advantageously, the control element can be arranged to cause further movement of the locking element to move it to a second position relative to the anchor. The second position is spaced from the first position. In order to tension the ladder clamp it is necessary for the second position to be spaced away from the anchor portion of the anchor member. For example, in the exemplary embodiments, the locking element is not fixed to the body of the ladder retaining part. One area of the locking element is biased towards a stop on the body in a direction of relative movement between the anchor part and the ladder retaining part. The cam acts on a second area of the locking element to move it against the biasing action thereby causing the locking element to pivot towards the clamped orientation. When in the clamped orientation further movement of the cam to urge the locking element against the biasing action causes the locking element to move away from the cam's axis. However, since the locking element is clamped to the anchor part, the result is that the body of the ladder retaining part moves towards the anchor of the anchor part. This is advantageous because it causes a tensioning of the ladder clamp in order to clamp firmly on the ladder.

It will be appreciated that the locking element clamps and unclamps to the first part by pivoting between the clamped and un-clamped orientations. Suitably this is achieved by the locking element contacting the anchor part in two locations. The first being located on a side of the anchor part at which the locking element pivots and the second being located on an opposed side of the anchor part. Thus the distance between the first and second locations in a direction perpendicular to a direction away from the anchor is greater in the unclamped orientation than in the claimed orientation. Consequently, a clamping force is applied by the two locations. In the exemplary embodiments, the locking element has a passageway through which the anchor part can pass. Here, the first and second locations are opposed sides of the passageway. In the exemplary embodiments, the anchor part includes an elongate section. Here the elongate section is receivable by the passageway. Suitably, the elongate section includes substantially parallel sides that the two locations each abut respectively.

According to a second aspect of the present invention there is provided a method of securing a ladder to a vehicle. The method comprises placing a ladder on fixings of the vehicle and using at least one ladder clamp to secure the ladder to the vehicle. The ladder clamp is in accordance with the first aspect. Here the method comprises causing the anchor of the anchor part to co-operate with the vehicle's fixing. The ladder retaining part is arranged to rest on the ladder at the first location and the securing means operated to move the locking element to the clamped orientation. Here the ladder retaining part is prevented from moving away from the anchor portion. Consequently there is provided a quick and repeatable method of securing the ladder.

Advantageously, the method comprises causing the body of the ladder retaining part to move to the second location. Thus the ladder clamp is tensioned. This is advantageous as it holds the ladder more securely to the fixing.

It is recognized that the two stage process of first clamping the locking element to the anchor part and then secondly tensioning the ladder clamp by causing the body to move away from the locking element and towards the anchor is advantages even if the locking element clamps to the anchor part in a non-pivoting way. Thus, according to a further exemplary embodiment, there is provided a ladder clamp comprising an anchor part and a ladder retaining part. An anchor portion of the anchor part is able to be arranged to co-operate with a fixing on a vehicle. The ladder retaining part includes a body and a securing means. The securing means is co-operable with the anchor part to clamp the ladder retaining part to the anchor part in a releasable manner. Suitably, the body is able to be arranged to restrict the movement of a ladder in order to secure a portion of the ladder to the fixing on the vehicle. Advantageously, the securing means comprises a locking element that is moveable between an un-clamped position and a clamped position. In the un-clamped position the locking element does not restrict relative movement between the anchor part and the ladder retaining part. Consequently, the ladder retaining part can be arranged in a first position relative to the anchor of the anchor part. In the clamped position the locking element clamps to the anchor part. Thus the locking element restricts movement of the ladder retaining part away from the anchor portion of the anchor part. This is achieved in the exemplary embodiments by the locking element abutting a stop on the body to prevent movement of the ladder retaining part. When in the clamped position, the locking element is further moveable away from the stop on the body.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIG. 1 shows a prior art system showing known ladder clamps securing a ladder to a vehicle's roof bars;

FIGS. 2 and 3 show the known ladder clamp of FIG. 1 in more detail;

DETAILED DESCRIPTION OF THE EMBODIMENTS

Figure 4:
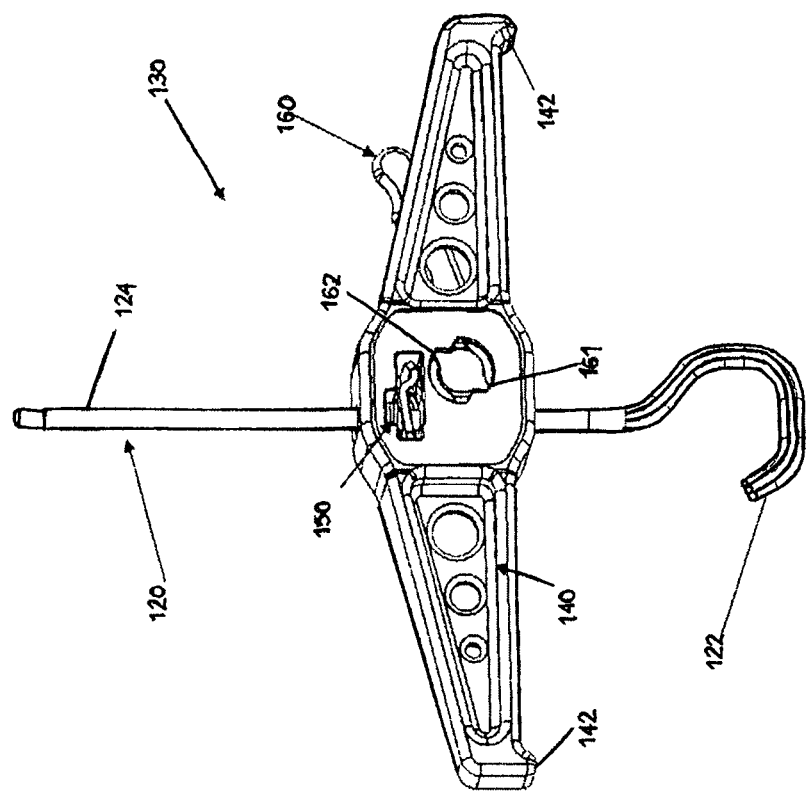
FIG. 4 shows a pictorial representation of a ladder clamp according to the present invention from a first side.

Referring to FIG. 4, a ladder clamp 110 comprises an anchor part 120 and a ladder retaining part 130. The anchor part 120 co-operates with a fixing on a vehicle. For instance, it is known to use a vehicle's roof bars. The ladder retaining part co-operates with the anchor part to provide a clamping force to hold a ladder between the roof bars and ladder retaining part 130.

The anchor part 120 is shown as a generally hooked shaped part 120. The anchor part 120 has an anchor portion, shown in the Figures as a hook 122 for securing under a roof bar. Although the anchor portion is shown as a hook, other shapes or configurations are also envisaged. Importantly the anchor portion provides a means to co-operate with the roof bar or other vehicle fixings in order to secure the anchor portion to the fixing. The anchor part 120 includes an elongated portion 124. Suitably, the elongated portion is shown as a rod that extends from the anchor portion. In use, the elongated portion is generally arranged to extend substantially upwardly from the vehicle. A difference to known ladder clamps is that the elongated portion 124 does not have a thread. Rather, the ladder retaining part 130 is freely moveable along the length of the elongated portion 124 and directly securable at any position. This is advantageous as threads are prone to rusting and degradation. Furthermore, it can take some time to twist the wing nut down the length of the elongated portion in the known prior art. Also, because the ladder retaining part is moveable in a linear direction, there is no need for the separate clamp bar present in known ladder clamps. Rather, stops 141, 142 are formed as part of the ladder retaining part 130. It will be appreciated that the stops prevent sideways movement of the ladder.

Figure 6:
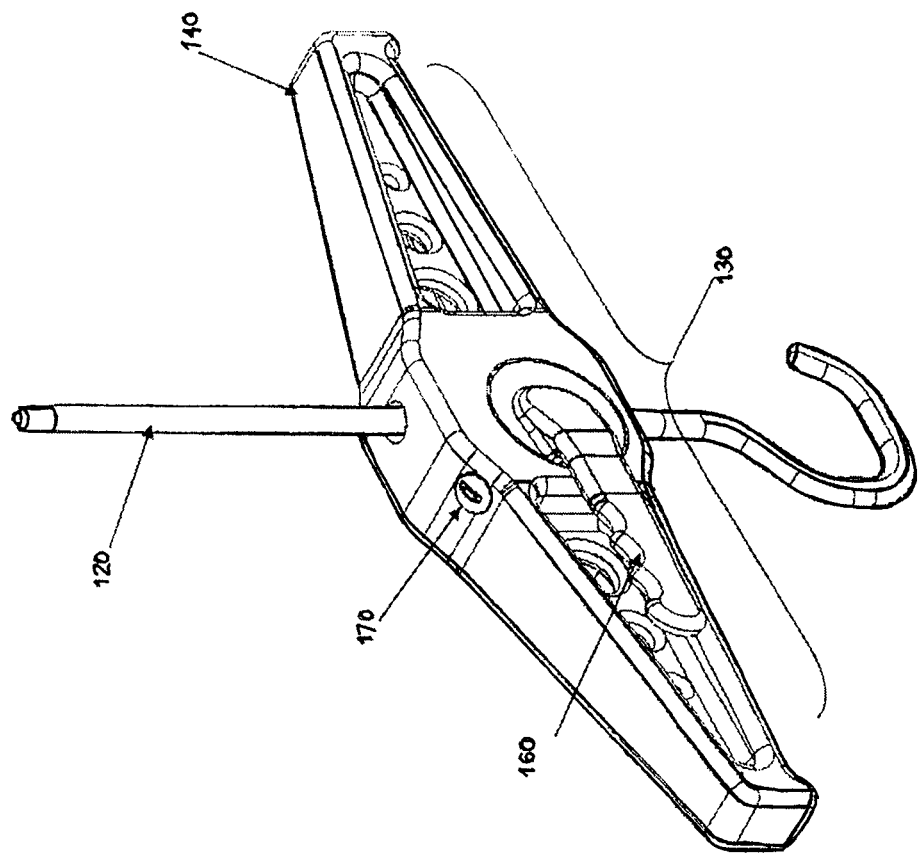
FIG. 6 shows a pictorial representation of FIG. 4 from the other side.

The ladder retaining part 130 comprises a body 140 and a securing means 150. The securing means secures the body 140 to the elongated portion 124. The securing means 150 is moveable between an un-clamped or unsecured position wherein the body is able to slide up and down the elongated portion and a clamped or secured position wherein movement is prevented (or at least substantially restricted). The securing means 150 is moveable between the two positions by a handle 160 that is rotatably mounted within the body 140. Stops 161, 162 are provided to stop the handle 160 from rotating past maximum extents in each direction. The maximum extents are preferably suitable for assembling/disassembling the parts of the anchor part. The ladder retaining part may include further means to restrict the movement of the handle past the unclamped and tensioned positions. A lock, shown here as a conventional barrel lock 170 (see FIG. 6), can be used to lock the handle 150 in position. However a more preferable lock is described later. Advantageously however, because the locking means is operated by a rotatable handle, locks can be integral to the ladder clamp as opposed to having to use separate padlock type locks as used with known ladder clamps.

Figure 5:
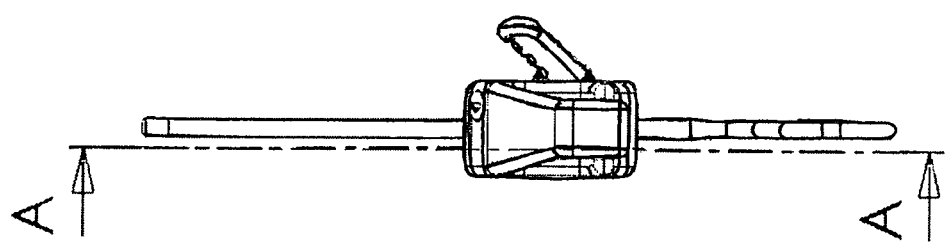
FIG. 5 is an end elevation view of FIG. 4.
Figure 7:
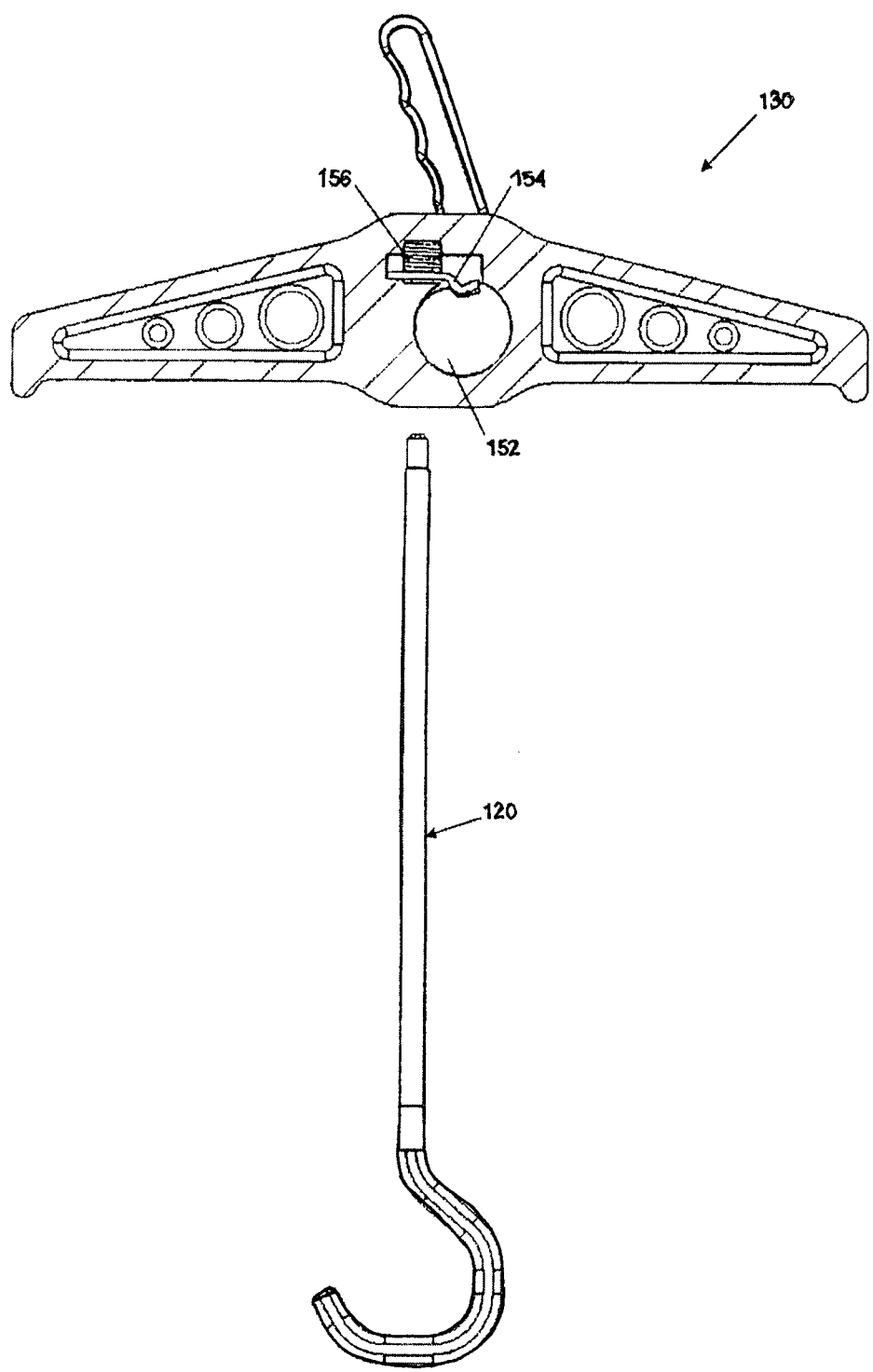
FIG. 7 shows a cross-sectional elevation view of a separated ladder clamp along line A-A of FIG. 5.
Figure 8:
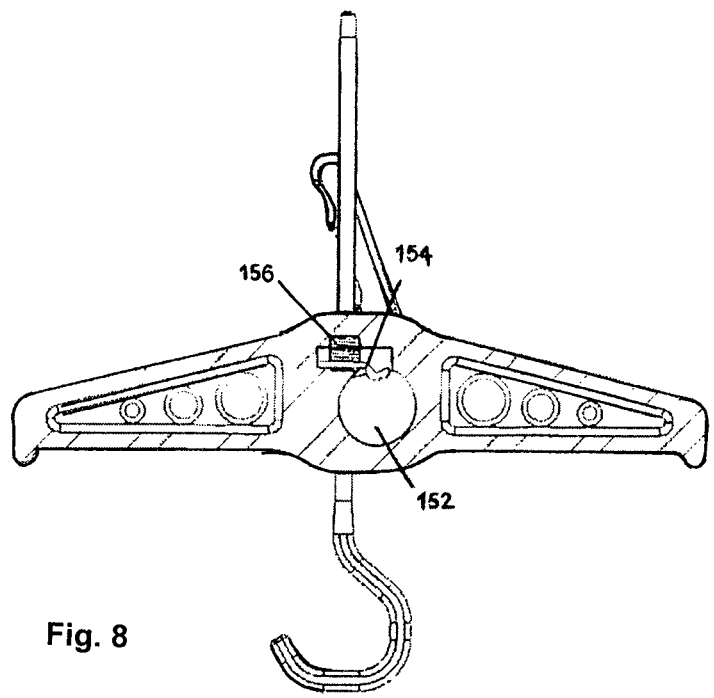
FIGS. 8 and 9 show a cross-sectional side elevational view of a ladder clamp in an unlocked and locked position respectively.
Figure 9:
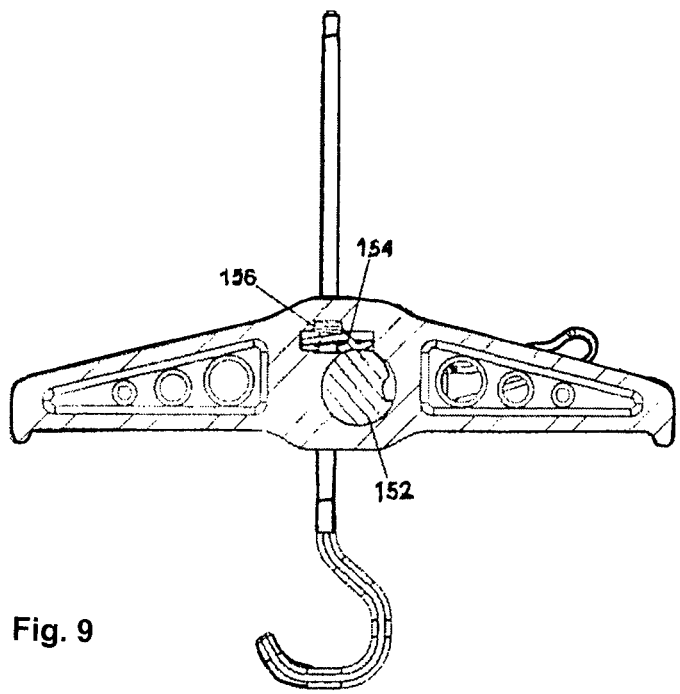

FIGS. 7-12 are cross sectional views through plane A (as shown in FIG. 5). The securing means 150 includes a control element, such as a cam 152, for moving a locking element. The locking element is suitably shown as a plate 154. The cam is directly rotatable by the handle 160. The plate 154 includes a passageway or aperture through which the elongated portion can pass. The cam causes the plate 154 to pivot with respect to the elongated portion. When the plate is substantially perpendicular to the elongated portion (i.e. FIG. 7 and FIG. 8), the elongated portion can slide relative to the plate 154. This is because the distance between the two sides of the aperture, when viewed down the longitudinal axis of the elongated part is arranged to be greater than the elongated part. When the plate is angled with respect to the elongated portion, the plate grips it tightly. This is because the distance between the two sides of the aperture has now been restricted. A spring 156 is provided to cause the plate to follow the cam and to cause the pivoting of the plate.

Figure 10:
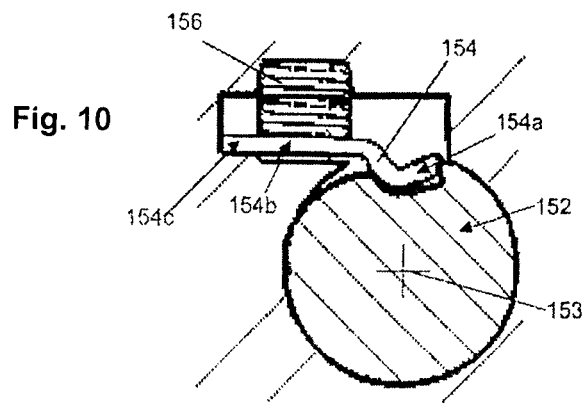
FIGS. 10-12 show enlarged views of a securing means for use in a ladder clamp and in unlocked, locked and tensioned arrangements.
Figure 11:
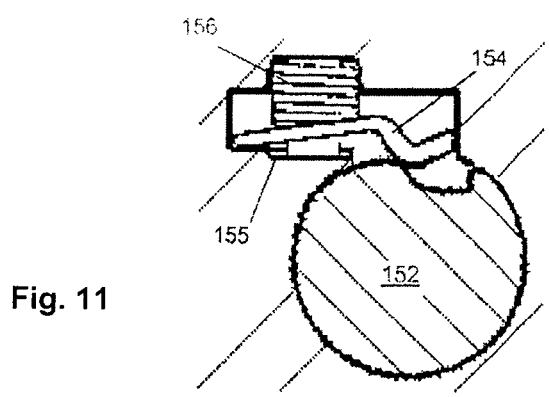
Figure 12:
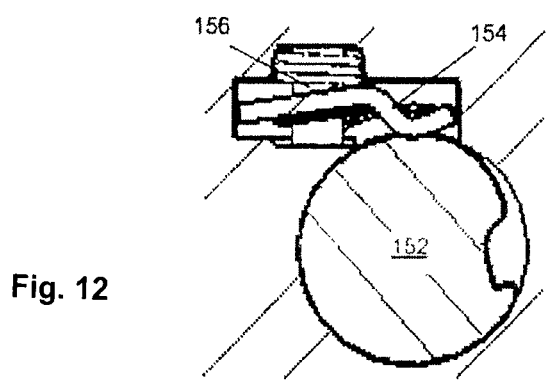
Figure 14:
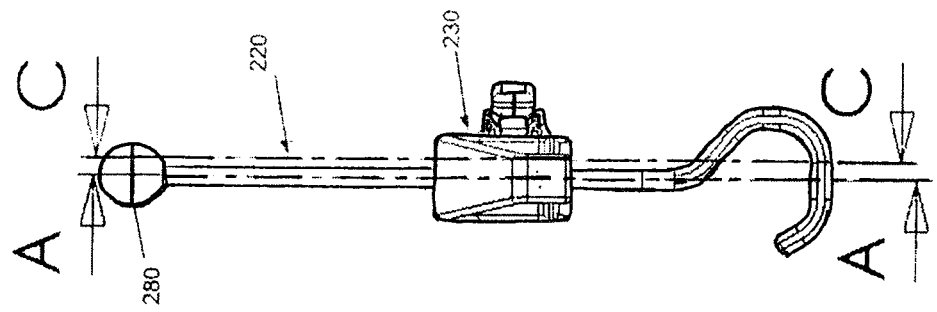
FIGS. 13 and 14 show a perspective side view and an end view respectively of a ladder clamp according to a second embodiment.

FIGS. 10-12 show the securing means 150 in more detail. The cam is mounted to the body by a rotation axis 153. The cam is arranged to act on one area of the locking element 154. This is shown in the figures as an end 154a of the locking element. Preferably, the cam is mounted in the centred on the body relative to an axial plane of the anchor part. Here (as shown in FIG. 15b, the cam includes a central groove 282. The central groove 282 runs along a part of the circumference of the cam and is arranged to accommodate the first part. Advantageously, this allows the rotation axis of the cam to be mounted closer to a passage of the ladder retaining part, through which the anchor part passes. Also, as herein described, abutment between the central groove and anchor part can restrict movement of the handle. Suitably, the end 154a is shaped so as to encourage movement of the locking elements between the respective orientations. For instance, the end 154a may include at least one elbow. In the un-secured arrangement (FIG. 10), the end of the locking element 154a contacts the cam at an area of the cam that is spaced closer to the rotation axis 153 than areas of the cam in an opposite direction to the rotating direction of the handle. In the figures, the area is shown as a recess. Thus, a surface of the cam abuts a distal end of the end 154a, which prevents rotation of the handle. Rotation of the handle is also prevented by abutment of the central groove and the anchor part. A biasing means, shown as suitably comprising a spring 156, arranged co-axial with the elongate portion, in use, biases a mid area 154b of the locking element towards a stop or shelf 155 formed on the body. Thus the locking element is urged to lie substantially perpendicular to the longitudinal axis of the elongated part.

As the cam is rotated the end 154a is caused to contact a surface spaced further from the cam's rotation axis. Thus the locking element 154 is urged to move away from the cam's rotational axis. Consequently, the locking element is moved away from the anchor relative to the body. As shown in FIG. 11, the cam is arranged to lift end 154a. Because the biasing means acts on a mid portion 154b that is spaced from the end 154a, the locking element is caused to pivot about opposite end 154c. Here, end 154c remains in contact with the shelf. In FIG. 11, the locking element is orientated to be angled across the elongated part such that it locks thereto.

Further rotation of the cam causes the locking element to contact a surface of the cam spaced yet further from the axis of rotation. Thus it remains in the second orientation and therefore locked to the elongate part but moves from a first position to a second position with respect to the body. In the first position, a portion (the end 154c) remains in contact with the shelf. In the second position, the locking element is spaced away from the shelf. It will be appreciated that this further rotation causes an automatic tensioning of the ladder clamp.

FIG. 10 shows the securing means in an unsecure position wherein the plate 154 is substantially perpendicular to the elongated portion. Consequently, in this arrangement, the ladder retaining part can be quickly removed and replaced. As the cam 152 is rotated, the plate 154 is pivoted about its free end until it is angled relative to the elongated portion sufficient to grip it tightly (as shown in FIG. 11). Further rotation of the cam causes the plate 154 to move upwardly with respect to the elongated portion. Since the plate is secured to the elongated portion, this upwardly movement causes the hook to move toward the ladder retaining part. Thus the securing means includes a mechanism to apply a final compressive force on the ladder.

Figure 13:
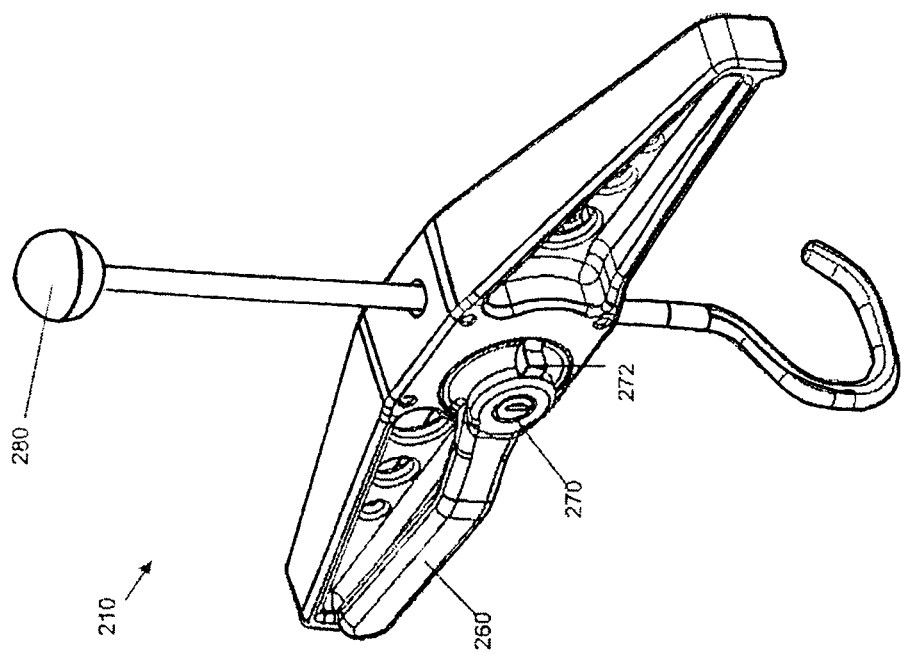

FIG. 13 shows a second embodiment of a ladder clamp 210 that is substantially the same as the first embodiment. A number of improvements will however be described.

As shown in FIG. 13, the ladder clamp 210 includes a stop such as a ball cap 280 on the end of the anchor part 220. The ball cap 280 is attachable to a distal end of the anchor part. For instance, the ball cap may be screwed on to a small length of thread formed on the distal end. The ball cap is arranged to provide the user with a more convenient area to grip in order to pull the anchor bar upwards when assembling the ladder clamp to a roof bar. The ball cap is removable so that the anchor and ladder retaining parts can be disassembled. However, in use, it is not necessary to remove the ball cap each time in order to attach and remove a ladder. Rather, it is sufficient to raise the ladder retaining part sufficiently to disengage the anchor from the roof bar.

Figure 15A:
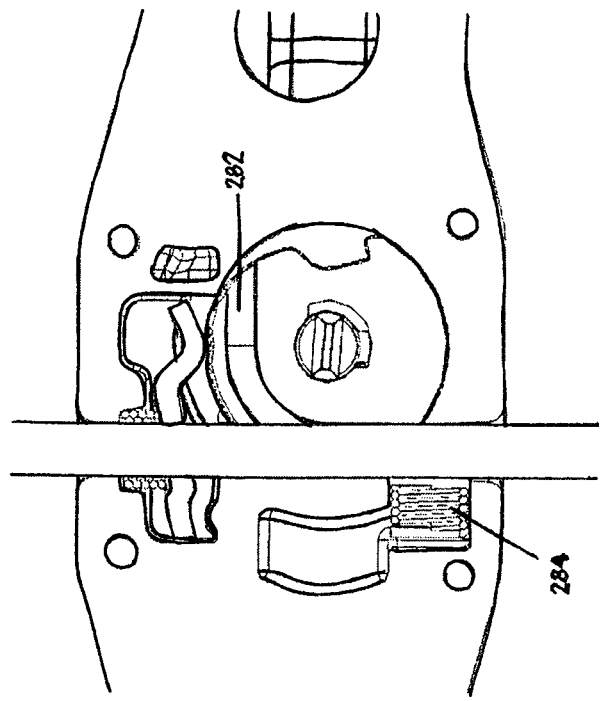
FIG. 15*a* shows an enlarged view of an area of FIG. 15.
Figure 15:
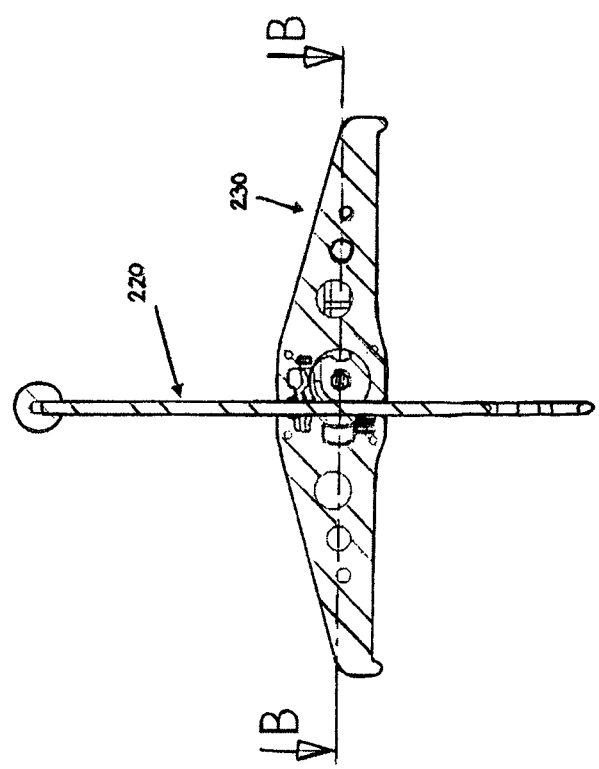
FIG. 15 shows a cross-sectional view along line A-A of FIG. 14.

Referring to FIG. 15, the ladder clamp 210 further includes a friction applicator. The Friction applicator applies a frictional force to resist relative movement of the anchor part and ladder retaining part at all times. For instance, the anchor part is arranged in use to extend through a passage in the body. The friction applicator applies a frictional force between that passage and anchor part in order to restrict the relative movement. The friction applicator is arranged to provide a frictional force to substantially overcome the gravitational force of the anchor part. Thus, the friction applicator provides a safety feature in that it prevents the anchor part from free falling once the locking means is moved to the un-clamped position. Rather, it means a positive force is required to move the ladder retaining part relative to the anchor part. The friction applicator is shown in FIGS. 15 and 15a as comprising a spring 284. The spring 284 is mounted in the body in a recess that extends perpendicularly to the passage through which the anchor part extends. One end of the spring therefore acts on a closed end of the recess and the other presses on the anchor part providing the friction.

Figure 16:
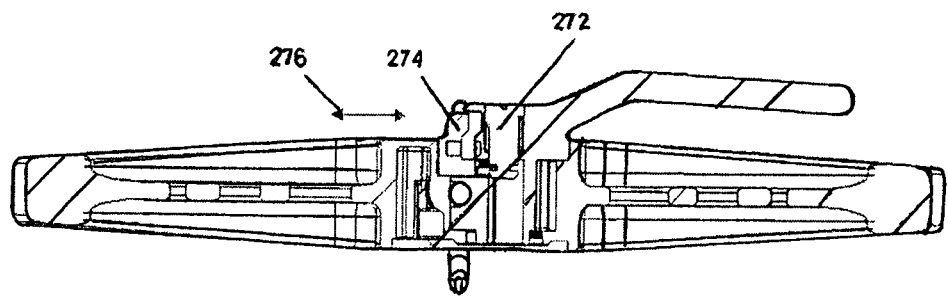
FIG. 16 shows a cross sectional view along line B-B of FIG. 15.
Figure 17:
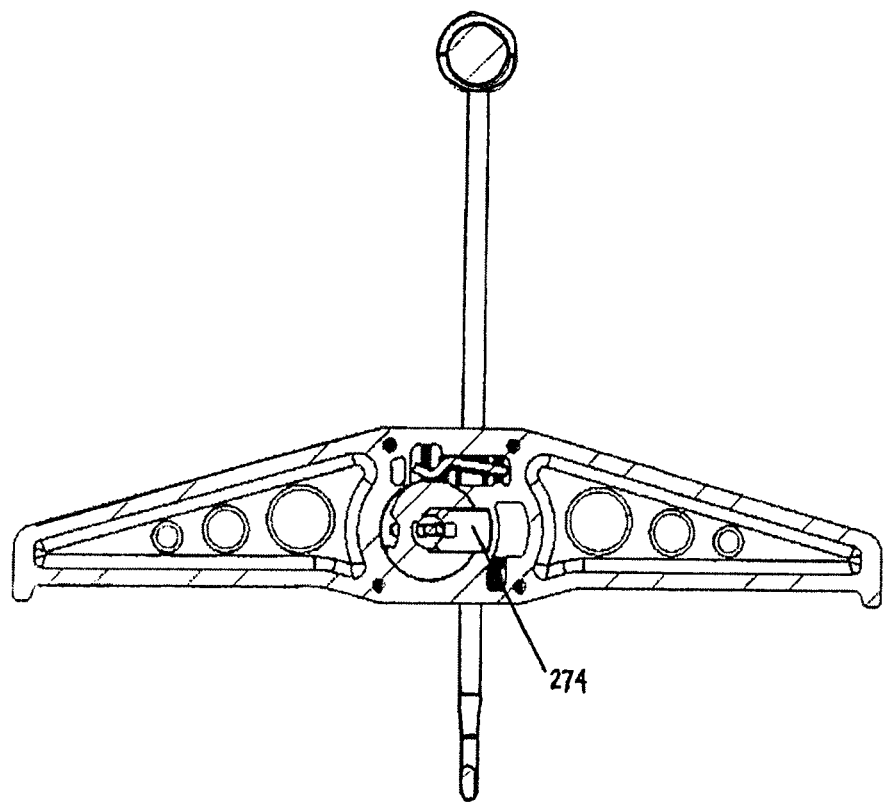
FIG. 17 shows a cross sectional view along line C-C of FIG. 14

Referring back to FIG. 13, an improved lock arrangement 270 is shown as being arranged on the handle 260 rather than the body as in the first embodiment. As shown in detail in FIGS. 16 and 17, the lock arrangement includes a barrel lock 272 and a catch 274. The catch 274 is moveably mounted with respect to the handle. The catch moves between a first position wherein the catch does not interfere with the body and a second position wherein the catch interferes with the body to stop rotation of the handle. When locked, the barrel lock 272 prevents movement of the catch from the second position to the first position. For instance, the catch is slidably mounted to move in the direction indicated by arrow 276. The catch is biased to move to the second position by a biasing means (not shown) such as a spring. When the handle is in the tensioned position, the catch is aligned with a recess in the body. Consequently the catch is free to move to the second position. The biasing means is therefore advantageous as it automatically causes the catch to move to the second position, preventing movement of the handle. When in the second position the barrel lock can be operated. Movement of the catch towards the first position is then prevented by abutment of the catch and barrel lock. To move the handle, the barrel lock is unlocked. Manually depressing the catch against the biasing means moves the catch to the first position. The handle is now able to be rotated. Once moved from the tensioned position, the catch is no longer aligned with the recess and so cannot move from the first position. The handle is therefore able to rotate. The lock arrangement 270 is preferable as it provides greater security. This is because the leverage of rotating the handle is prevented by the greater area and robustness of the catch engaging the recess. The barrel lock simply prevents lateral movement of the catch. It is anticipated that the lock arrangement may be useable on its own. Therefore whilst the lock arrangement has been described in relation to the locking specific locking means of the ladder clamp, these are not necessarily limiting factors for the locking arrangement. Rather all that is required is an anchor part of a ladder clamp being relatively moveable to a ladder retaining part. The ladder clamp including a locking means to lock the two parts together. Wherein the locking means is activated by rotation of a handle and the handle or one of the parts includes the locking arrangement.

Although preferred embodiment(s) of the present invention have been shown and described, it will be appreciated by those skilled in the art that changes may be made without departing from the scope of the invention as defined in the claims.

The invention claimed is:

1. A ladder clamp comprising:
    an anchor part comprising an anchor portion that is able to be arranged to co-operate with a fixing on a vehicle; and
    a ladder retaining part configured to extend across both rails of a ladder to clamp the ladder at two spaced locations, the ladder retaining part comprising:
        a body; and
        a securing element, the securing element being co-operable with the anchor part to clamp the ladder retaining part to the anchor part in a releasable manner,
    wherein the securing element comprises:
        a locking element that is able to pivot with respect to the body between un-clamped and clamped orientations; and
        a control element housed within the body, the control element comprising a cam,
    wherein a recess is defined in a surface of the cam to engage with the locking element when the ladder clamp is in the un-clamped orientation, and
    wherein in the un-clamped orientation, the locking element does not restrict relative movement between the anchor part and the ladder retaining part and in the clamped orientation the locking element clamps to the anchor part so that abutment of the locking element with the body restricts movement of the ladder retaining part away from the anchor portion of the anchor part.

2. The ladder clamp as claimed in claim 1, wherein:
    the securing element comprises a movement element, the movement element comprising the control element for moving a first part of the locking element away from a point on the body to cause the locking element to pivot from the un-clamped orientation to the clamped orientation.

3. The ladder clamp as claimed in claim 1, wherein:
    the securing element includes a biasing member that urges a second part of the locking element towards a point on the body.

4. The ladder clamp as claimed in claim 3 wherein a first part of the locking element is spaced from the second part of the locking element to cause the locking element to pivot about a third part of the locking element.

5. The ladder clamp as claimed in claim 4, wherein the third part of the locking element is not fixed to the body.

6. The ladder clamp as claimed in claim 2 wherein:
    the control element causes the locking element to move away from a first position to a second position relative to the body, the first position being the clamped orientation and the second position being spaced away from the first position relative to the body in order to tension the ladder clamp.

7. The ladder clamp as claimed in claim 2 wherein the cam is mounted to the body at a fixed rotation point.

8. The ladder clamp as claimed in claim 7, wherein the cam is dimensioned such that a surface of the cam that engages the locking element in the un-clamped orientation is spaced closer to the fixed rotation point than a surface of the cam that engages the locking element in the clamped orientation.

9. The ladder clamp as claimed in claim 8, wherein the surface of the cam that engages the locking element in a second position is spaced further from the fixed rotation point than the surface of the cam that engages the locking element in the un-clamped orientation.

10. The ladder clamp as claimed in claim 2, wherein the movement element includes a handle to move the control element and the securing element further includes a lock to lock the movement of the handle.

11. The ladder clamp as claimed in claim 1 wherein the anchor part includes an elongate part and the securing element locks to the elongate part.

12. The ladder clamp as claimed in claim 1 wherein the locking element includes a passageway and the anchor part is able to be arranged to pass through the passageway when the locking element is in the un-clamped orientation.

13. A method of securing a ladder to a vehicle, comprising:
    arranging a ladder on fixings of the vehicle;
    using at least one ladder clamp to secure the ladder to the vehicle, wherein:
        the ladder clamp comprises an anchor part and a ladder retaining part,
        the anchor part includes an anchor portion able to be arranged to co-operate with the fixings, the ladder retaining part includes a body and a securing element, the securing element is co-operable with the anchor part to clamp the ladder retaining part to the anchor part in a releasable manner, the securing element comprises a locking element that is able to pivot with respect to the body between un-clamped and clamped orientations, the securing element comprises a movement element, the movement element comprising a control element housed within the body for moving a first part of the locking element away from a point on the body to cause the locking element to pivot from the un-clamped orientation to the clamped orientation, the control element comprises a cam and a recess is defined in a surface of the cam to engage with the locking element when the ladder clamp is in the un-clamped orientation, and in the un-clamped orientation the locking element does not restrict relative movement between the anchor part and the ladder retaining part and in the clamped orientation the locking element clamps to the anchor part so that abutment of the locking element with the body restricts movement of the ladder retaining part away from the anchor portion of the anchor part;

causing the anchor portion of the anchor part to co-operate with the vehicle's fixing;

arranging the ladder retaining part to rest on the ladder; and operating the securing element to pivot the locking element to the clamped orientation such that the ladder retaining part is prevented from moving away from the anchor portion.

14. The method as claimed in claim 13, wherein the method comprises causing the locking element to move to a second position in order to tension the ladder clamp.

15. The method as claimed in claim 13 wherein the method comprises rotating a handle to move the locking element.

16. The ladder clamp as claimed in claim 1, wherein the anchor portion has a hook-like shape and a cylindrical cross-section.

17. The ladder clamp as claimed in claim 1, wherein the locking element comprises at least one elbow.

18. The method as claimed in claim 13, wherein the ladder retaining part is configured to extend across both rails of a ladder to clamp the ladder at two spaced locations.

19. The method as claimed in claim 13, wherein the anchor portion has a hook-like shape and a cylindrical cross-section.

\* \* \* \* \*